(No Model.)  2 Sheets—Sheet 1.

H. E. WILLARD.
Fishing Apparatus.

No. 240,630. Patented April 26, 1881.

WITNESSES:
Chas. H. Kimball
Wm. L. Goodwin

INVENTOR:
Henry E. Willard
by Clifford & Clifford
Attys (No Model.) 2 Sheets—Sheet 2.

H. E. WILLARD.
Fishing Apparatus.

No. 240,630. Patented April 26, 1881.

WITNESSES:
Chas. H. Kimball.
Wm. L. Goodwin.

INVENTOR:
Henry E. Willard
by
Clifford & Clifford
Attys

UNITED STATES PATENT OFFICE.

HENRY E. WILLARD, OF CAPE ELIZABETH, MAINE, ASSIGNOR OF ONE-HALF TO AUGUSTUS M. NICKERSON, OF HARWICH, MASSACHUSETTS.

FISHING APPARATUS.

SPECIFICATION forming part of Letters Patent No. 240,630, dated April 26, 1881.

Application filed December 20, 1880. (No model.)

*To all whom it may concern:*

Be it known that I, HENRY E. WILLARD, of Cape Elizabeth, in the county of Cumberland and State of Maine, have invented certain new and useful Improvements in Fishing Apparatus; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in apparatus for catching and dressing fish; and the object of my improvement is to provide a net or sack, into which, when fitted to the fishing-vessel, the fish which have been caught in a fishing-seine may be transferred from the seine and held alongside the vessel and kept alive in the water until they are dressed for packing. I attain this object by the mechanism illustrated in the accompanying drawings, in which—

Figure 1:
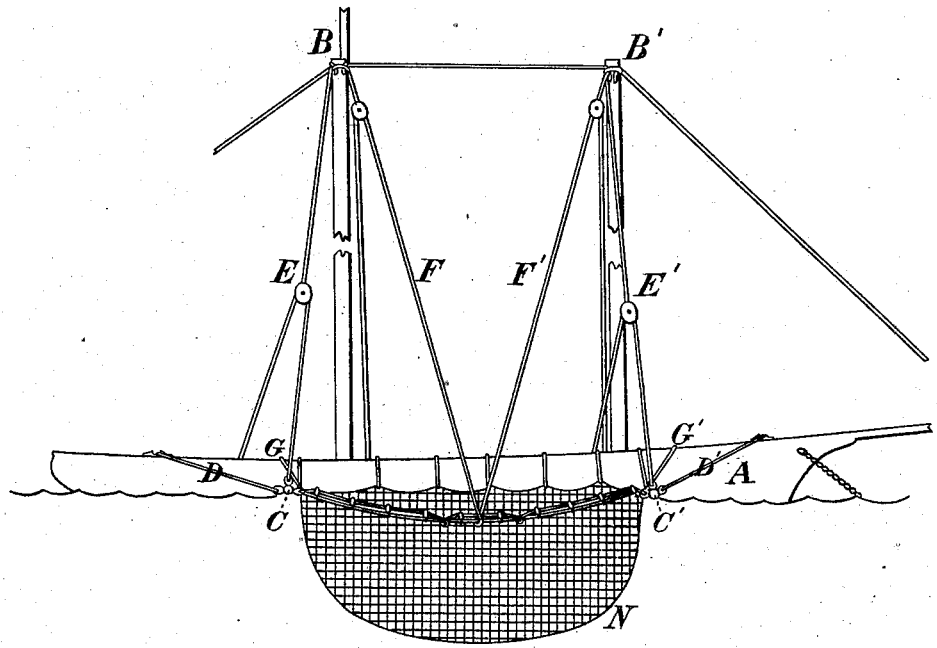
Figure 2:
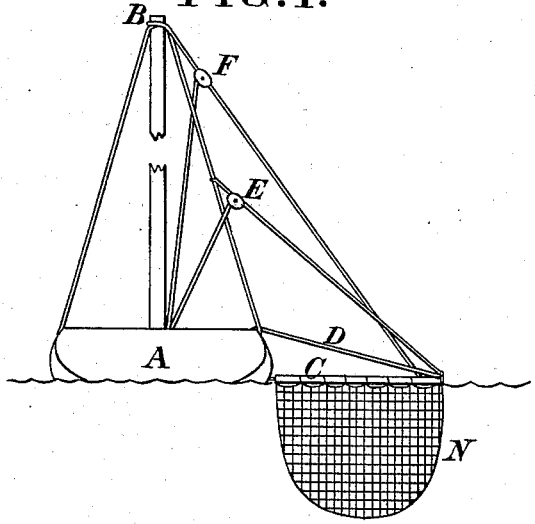
Figure 3:
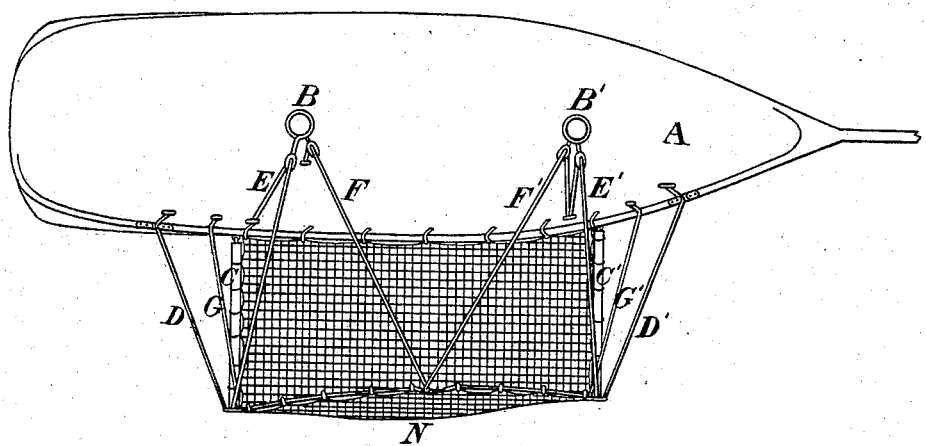
Figure 4:
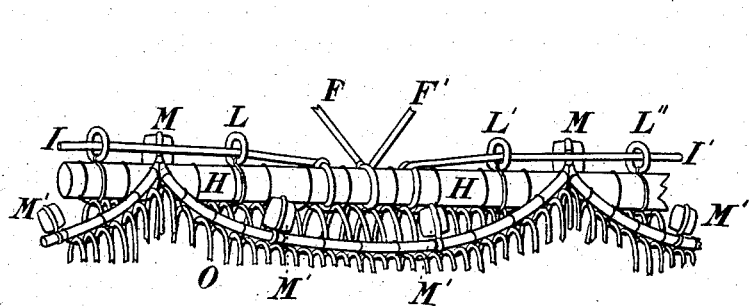
Figure 5:
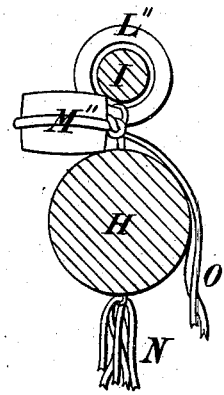

Figure 1 is a side view. Fig. 2 is an end view. Fig. 3 is a top view. Fig. 4 is a detail of the edges of my invention and of the seine, to show the head-line of the sack with the lace-line, and the grommets and the corks of the seine fastened between them. Fig. 5 is a further detail, in section, of a head-line, lace-line, and corks.

Similar letters refer to similar parts throughout the several views.

A is the hull of the fishing-vessel. B B' are masts. C C' are booms attached to the hull. D D' are guys attached to the outer ends of the booms. E E' are common tackle and falls attached to the masts or shrouds and the booms. F F' are tackle and falls attached to the mast and the head-line of the bag at the middle of the outer edge. G G' are outhauls attached to the two outer corners of my sack, and running through blocks on the outer ends of the booms. H is the head-line of the bag. I I' are the lace-lines. L L' L'' are the grommets, through which the lace-line runs. M M' M'' are the corks on the seine, to show the method of attaching the seine to the bag. N is the bag. O is the seine.

The booms are twelve to thirteen feet in length outboard, and of a diameter of about five inches. They are attached at their inner ends to the hull in any suitable manner to allow the outer ends to move freely in different directions. Tackle and falls E E' from the masts extend to their outer ends, by which to raise and lower them, and to support the weight of the bag.

The guys D D', attached to the outer ends of the boom, serve to adjust the booms in a lateral direction and hold them in place against the strain from the bag as the vessel rolls.

The outhauls G G' are attached to the outer corners of the bag, and run through blocks on the outer ends of the booms in upon the deck, and their use is to lower and raise the outer edge of the bag beneath and above the surface of the water, as more fully described hereinafter.

The lace-lines I I' are permanently attached to the center of the head-line on the outer edge of the bag, and run each way from the center through the grommets, and fasten at the outer corners of the bag itself.

The grommets L L' L'' are iron thimbles, fastened in any suitable manner upon the head-line H, at a distance apart from each other of about one foot.

The supporting-lines F F', attached to the center of the bag's head-line H, are of use, when the vessel is rolling heavily, to take off from the lines E E' a part of the strain of the bag.

The head-line H is a two-inch rope, and the netting of my bag is attached in the usual way employed in seines. The netting of the bag is one-inch mesh, and is made of No. 24 thread. The bag is fastened to the booms by loops attached to the head-line H, and to the side of the vessel in any suitable way at the rail. The length of the bag is determined by the size of the vessel. An ordinary fishing-schooner will permit the booms to be placed from thirty to thirty-five feet apart, and the bag may be of that length. It may be about seven fathoms in depth.

In the use of my device the bag is attached, as described, to the vessel's rail and to the booms, and allowed to drop into the sea until the edge at the head-line H is brought within a few feet of the surface of the water—say five feet. The seine is brought alongside the bag by means of the seine-boat containing the catch of fish. The outer edge of the seine which is floating opposite the seine-boat is then fastened to the edge of the bag, along the whole front of the bag, between the outer ends of the booms. This is done by slackening the two lace-lines I I', by untying them at the corners of the bag, so that they may be pulled up a little between the grommets L L' and form loops; then the corks M M' M'' of the seine on that portion of the outer edge of the seine which is floating alongside the bag are thrust in between the lace-lines and the head-line, one cork in each space between the grommets. The lace-lines are pulled taut and fastened to the bag at each corner. This forms a continuous connection between the seine and the front edge of the bag. Now the lines F F' are slackened on shipboard, also the outhauls G G' are paid out, and the front edge of the bag is allowed to sink a little below the surface of the sea. The men in the seine-boat now commence drawing the seine into the boat. As this is continued the fish are forced out of the seine over into the bag. When the seine is fully drawn into the boat the edge of the bag is drawn above water by pulling upon the outhauls G G', also, if need be, upon the lines F F'. Thus the fish are transferred into the bag, where they are held in safety, by means of the edge of the bag all around being raised above the surface of the water. The seine is then unfastened by untying the lace-lines and withdrawing the corks from between them and the head-line.

My bag is made of thread which cannot be torn by the fish-eaters. Therefore there is no need of taking the catch of fish in upon deck, but they may lie alongside, and are taken out as they are needed in dressing. Another benefit is, that the seine can be emptied in a few minutes and stowed in the boat, whereas in rough water the rolling of the vessel may burst the seine as it lies alongside, subjected to the strain caused by the great weight of the fish during the process of taking them aboard.

It is of great importance to make the seine as light in weight as possible, to lessen the labor of handling. This necessitates using a thread too fine to resist the fish-eaters, or to bear the unavoidable strain brought to bear upon it without the use of my device.

Having thus described my invention, what I claim, and desire to secure by Letters Patent, is—

The bag N, in combination with the seine O, the lace-lines I I', the grommets L L' L'', the outhauls G G', the booms C C', the head-line H, the corks M M', the supporters E E', and the guys D D', as and for the purposes herein set forth.

In testimony that I claim the foregoing as my own I affix my signature in presence of two witnesses.

HENRY E. WILLARD.

Witnesses:
  W. H. WALDRON,
  JOHN P. KERRIGAN.